(12) United States Patent
HomChaudhuri et al.

(10) Patent No.: US 8,891,703 B2
(45) Date of Patent: Nov. 18, 2014

(54) SYSTEMS AND METHODS FOR ANTENNA MANAGEMENT USING PER-PACKET CHANNEL INFORMATION

(71) Applicant: QUALCOMM Incorporated, San Diego, CA (US)

(72) Inventors: Sandip HomChaudhuri, San Jose, CA (US); Kai Shi, San Jose, CA (US); Alireza Raissinia, Monte Sereno, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/826,659

(22) Filed: Mar. 14, 2013

(65) Prior Publication Data

US 2014/0269994 A1    Sep. 18, 2014

(51) Int. Cl.
*H04B 7/10* (2006.01)
*H04W 52/02* (2009.01)
*H04B 7/08* (2006.01)

(52) U.S. Cl.
CPC ......... *H04W 52/0209* (2013.01); *H04B 7/0822* (2013.01)
USPC ........... 375/347; 375/316; 375/349; 375/259; 375/260; 375/295; 375/299

(58) Field of Classification Search
USPC ......... 375/316, 347, 349, 259, 267, 260, 295, 375/299
See application file for complete search history.

(56) References Cited

U.S. PATENT DOCUMENTS

| | | | |
|---|---|---|---|
| 7,146,134 B2 * | 12/2006 | Moon et al. | 455/67.11 |
| 8,160,648 B2 | 4/2012 | Ulupinar et al. | |
| 2006/0023669 A1 * | 2/2006 | Yamaura et al. | 370/335 |
| 2008/0051046 A1 * | 2/2008 | Ruckriem | 455/132 |
| 2009/0017766 A1 * | 1/2009 | Patel et al. | 455/67.11 |
| 2010/0061489 A1 | 3/2010 | Liu et al. | |
| 2011/0136446 A1 | 6/2011 | Komninakis et al. | |
| 2011/0201295 A1 | 8/2011 | Ma et al. | |

* cited by examiner

*Primary Examiner* — Siu Lee
(74) *Attorney, Agent, or Firm* — Holland & Hart LLP

(57) ABSTRACT

A wireless device that operates in accordance with the IEEE 802.11 standard receives the preamble of a packet with the highest number of receive chains enabled, thereby obtaining the highest gain, detection sensitivity and range. The wireless device determines a signal-to-noise ratio (SNR) in response to two different short training fields (STFs) in the preamble. The wireless device also determines a modulation and coding scheme (MCS) and a number of spatial streams (Nss) used to transmit the received packet in response to a signal field of the preamble. The wireless device uses these determined parameters to identify a minimum number of the receive chains required to reliably receive the packet. The wireless device uses only the identified minimum number of receive chains to perform channel estimation and receive the data portion of the packet.

25 Claims, 4 Drawing Sheets

|  |  | MCS | 20MHz BAND | | | 40MHz BAND | | | 80MHz BAND | | |
|---|---|---|---|---|---|---|---|---|---|---|---|
|  |  |  | 3T3R | 2T2R | 1T1R | 3T3R | 2T2R | 1T1R | 3T3R | 2T2R | 1T1R |
| Nss=1 | 802.11n/ac rates | MCS0 | -95 | -94 | -92 | -92 | -91 | -89 | -89 | -88 | -86 |
|  |  | MCS1 | -93 | -91 | -89 | -90 | -88 | -86 | -87 | -85 | -83 |
|  |  | MCS2 | -91 | -90 | -87 | -88 | -87 | -84 | -85 | -84 | -81 |
|  |  | MCS3 | -88 | -86 | -83 | -85 | -83 | -80 | -82 | -80 | -77 |
|  |  | MCS4 | -85 | -83 | -80 | -82 | -80 | -77 | -79 | -77 | -74 |
|  |  | MCS5 | -81 | -79 | -76 | -78 | -76 | -73 | -75 | -73 | -70 |
|  |  | MCS6 | -79 | -77 | -75 | -76 | -74 | -72 | -73 | -71 | -69 |
|  |  | MCS7 | -77 | -76 | -74 | -74 | -73 | -71 | -71 | -70 | -68 |
|  | 802.11ac rates | MCS8 | -74 | -71 | -69 | -71 | -68 | -66 | -68 | -65 | -63 |
|  |  | MCS9 | -72 | -69 | -68 | -69 | -66 | -65 | -66 | -63 | -62 |
| Nss=2 | 802.11n/ac rates | MCS0 | -93 | -92 |  | -90 | -89 |  | -87 | -86 |  |
|  |  | MCS1 | -91 | -90 |  | -88 | -87 |  | -85 | -84 |  |
|  |  | MCS2 | -89 | -87 |  | -86 | -84 |  | -83 | -81 |  |
|  |  | MCS3 | -86 | -84 |  | -83 | -81 |  | -80 | -78 |  |
|  |  | MCS4 | -82 | -80 |  | -79 | -77 |  | -76 | -74 |  |
|  |  | MCS5 | -78 | -76 |  | -75 | -73 |  | -72 | -70 |  |
|  |  | MCS6 | -76 | -75 |  | -73 | -72 |  | -70 | -69 |  |
|  |  | MCS7 | -75 | -74 |  | -72 | -71 |  | -69 | -68 |  |
|  | 802.11ac rates | MCS8 | -72 | -69 |  | -69 | -66 |  | -66 | -63 |  |
|  |  | MCS9 | -70 | -68 |  | -68 | -65 |  | -64 | -62 |  |
| Nss=3 | 802.11n/ac rates | MCS0 | -92 |  |  | -89 |  |  | -86 |  |  |
|  |  | MCS1 | -90 |  |  | -87 |  |  | -84 |  |  |
|  |  | MCS2 | -87 |  |  | -84 |  |  | -81 |  |  |
|  |  | MCS3 | -84 |  |  | -81 |  |  | -78 |  |  |
|  |  | MCS4 | -81 |  |  | -78 |  |  | -75 |  |  |
|  |  | MCS5 | -76 |  |  | -73 |  |  | -70 |  |  |
|  |  | MCS6 | -75 |  |  | -72 |  |  | -69 |  |  |
|  |  | MCS7 | -74 |  |  | -71 |  |  | -68 |  |  |
|  | 802.11ac rates | MCS8 | -69 |  |  | -66 |  |  | -63 |  |  |
|  |  | MCS9 | -67 |  |  | -64 |  |  | -61 |  |  |

RX SENSITIVITY @ AWGN @ 10% PER FOR 1000B PACKETS

FIG. 2

SYSTEMS AND METHODS FOR ANTENNA MANAGEMENT USING PER-PACKET CHANNEL INFORMATION

FIELD OF THE INVENTION

The present invention relates to a wireless communication system, and in particular, to a multiple input multiple output (MIMO) wireless communication system.

RELATED ART

Power consumption of a wireless station during the active receive mode and the beacon receive mode are important parameters to users of the wireless station. This power consumption is largely determined by the number of active receive chains enabled within the wireless station during receive operations. In a multiple antenna system, the link to the wireless station can operate in various modes, including: single input single output (SISO), single input multiple output (SIMO), multiple input single output (MISO) and multiple input multiple output (MIMO). The SISO mode exhibits no diversity, wherein a single transmit chain transmits a single stream to a single receive chain. The SIMO mode exhibits receive diversity, wherein a single transmit chain transmits a single stream to multiple receive chains. The MISO mode exhibits transmit diversity, wherein multiple transmit chains transmit multiple streams to a single receive chain.

A MIMO wireless communication system includes multiple transmit chains in a transmitting station (STA) and multiple receive chains in a corresponding receiver STA. If the number of receive chains exceeds the number of transmitted data streams, receive diversity exists. Receive diversity provides an improved maximal ratio combining (MRC) gain, thereby increasing sensitivity and detection (and therefore range) of the receiver STA. However, each additional receive chain undesirably requires more power within the receiver STA.

Note that the improved detection capability provided by receive diversity may only be necessary for a relatively short period (e.g., while receiving the preamble of a packet). If the channel is deemed good, such MRC gains may not be necessary to achieve a desired packet error rate (PER) for the transmitted number of data streams and the modulation and coding scheme (MCS) being implemented. This overcompensation for the channel comes at a cost of very high power consumption, impacting key power parameters such as active receive power and beacon receive power. It would therefore be desirable to have methods and structures for efficiently reducing a number of active receive chains within in a receiver STA when receive diversity is not necessary.

SUMMARY

Accordingly, the present invention provides a wireless device having a plurality of receive chains for receiving transmitted packets. All of the receive chains of the wireless device (e.g., N receive chains) are initially enabled to receive the preamble of the packet. A preamble processor determines a first running signal-to-noise ratio (SNR) in response to a legacy short training field (L-STF) included in the preamble of the packet. The preamble processor subsequently determines a second running SNR by modifying the first running SNR in response to a (very) high-throughput short training field (V)HT-STF of the preamble. The preamble processor determines a minimum number of the receive chains required to reliably receive a data portion of the packet in response to the second running SNR, wherein the minimum number of receive chains may be designated $N_R$.

In another embodiment, the preamble processor also decodes a (very) high-throughput signal field (V)HT-SIG of the preamble to identify a modulation and coding scheme (MCS) of the packet, and to identify a number (Nss) of spatial streams used to transmit the packet. In this embodiment, the preamble processor also uses the identified MCS and the identified number of spatial streams to determine the minimum number ($N_R$) of receive chains required to reliably receive the data portion of the packet.

Upon determining the minimum number ($N_R$) of receive chains required to reliably receive the data portion of the packet, the preamble processor disables the receive chains of the wireless device, as necessary, such that only the minimum number ($N_R$) of receive chains remain enabled to receive the data portion of the packet.

In addition, a MIMO demodulator and decoder of the wireless device performs channel estimation in response to the determined minimum number ($N_R$) of receive chains. In one embodiment, the preamble processor is operated at a frequency high enough (e.g., high operating clock and/or using parallel processing) to ensure that the minimum number ($N_R$) of receive chains is determined before receiving (very) high-throughput long training fields (V)HT-LTFs of the preamble of the packet, which are used in the channel estimation process.

In another embodiment, the preamble processor buffers the (V)HT-LTFs of the preamble while the minimum number ($N_R$) of receive chains is determined. After the minimum number ($N_R$) of receive chains has been determined, channel estimation is performed using the buffered (V)HT-LTFs.

In another embodiment, a plurality of channel estimations are performed in parallel, wherein each of the channel estimations assumes a different number and combination of enabled receive chains. After the minimum number ($N_R$) of receive chains has been determined, the channel estimation corresponding with the determined minimum number and a specific combination of receive chains is selected.

In accordance with another embodiment of the present invention, the above-described processes are repeated for each packet received by the wireless device.

In another embodiment, channel reciprocity principles are applied, wherein the minimum required number of active receive chains $N_R$ is determined, and the result is used to select a corresponding number of active transmit chains $N_T$ used to transmit signals from the same wireless device. More specifically, the number of active transmit chains $N_T$ is selected to be equal to $N_R$, and greater than or equal to the number of spatial streams Nss of the transmit path.

In another embodiment, receive chains that are not used (i.e., receive chains that are not included in the selected set of active receive chains $N_R$) are repurposed to receive other signals. For example, an unused receive chain can be used to perform scanning for other adjoining 802.11 channels. In another example, an unused receive chain can be loaned to a Bluetooth receiver on the same wireless device.

The present invention will be more fully understood in view of the following description and drawings.

BRIEF DESCRIPTION OF THE DRAWINGS

FIG. 2 is a block diagram of receiver sensitivity lookup table that is used to identify a minimum number of the receive chains to be enabled within the wireless device of FIG. 1 accordance with one embodiment of the present invention.

DETAILED DESCRIPTION

Figure 1:
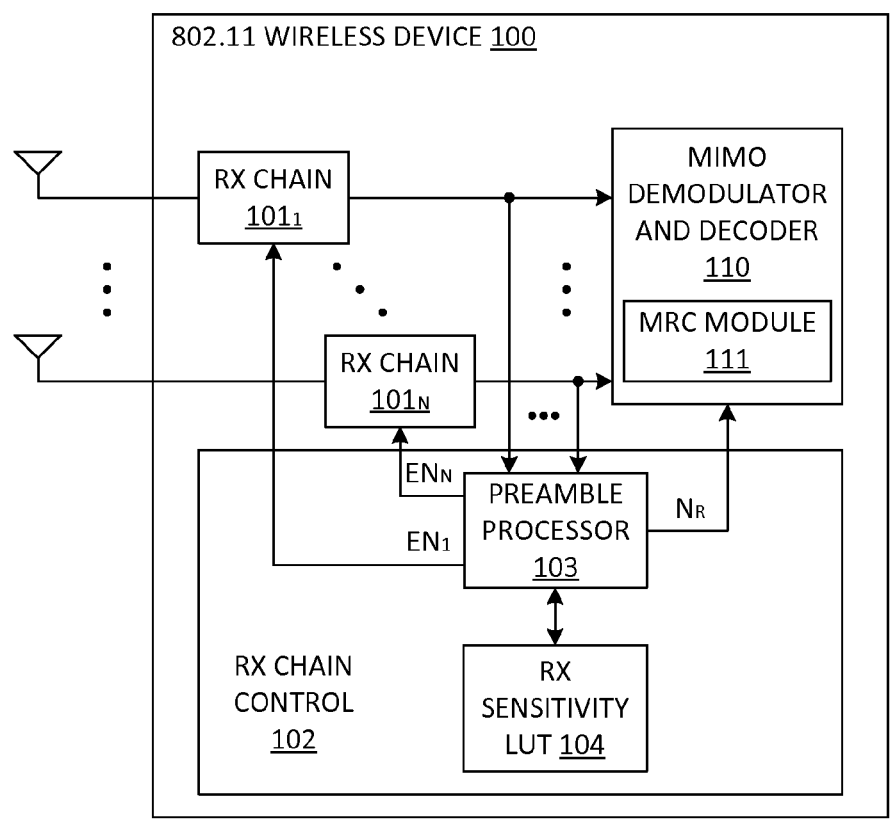
FIG. 1 is a block diagram of a wireless device that implements a plurality of receive chains in accordance with one embodiment of the present invention.

In general, the present invention provides methods for implementing a MIMO (or SIMO) system that exhibits receive diversity, and transmits and receives packets in accordance with the IEEE 802.11 standard. A wireless device starts receiving each packet with the highest number of receive chains enabled, thereby obtaining the highest MRC gain and the highest detection sensitivity (and therefore the highest range). The wireless device determines a signal-to-noise ratio (SNR) in response to one or more short training fields (STFs) in the preamble of the received packet. The wireless device also determines a modulation and coding scheme (MCS) of the packet and the number (Nss) of active downlink (transmit) data streams (spatial streams) being used to transmit the packet in response to one or more signal fields in the preamble of the received packet. The wireless device then determines a first minimum number ($N_R$) of receive chains required to receive the packet with a predetermined packet error rate (PER), using the determined SNR, MCS, and number of spatial streams (Nss).

If the number of enabled receive chains in the wireless device is greater than the number of active downlink spatial streams Nss (i.e., there is receive diversity), and the estimated SNR is greater than a determined minimum SNR by a predetermined threshold, then the downlink data streams can be reliably received by the receiver without enabling all of the receive chains. Under these conditions, the additional receive chains are shut off (such that the number of enabled receive chains matches the number of downlink data streams), thereby saving power within the wireless device. This per packet adaptation provides opportunistic power savings without any adverse impact to receive sensitivity.

The above-described assessment can be performed fast, e.g., before channel estimation, for packets transmitted with a single active downlink data stream (hereinafter referred to as single stream packets). Single stream packets include, for example, packets transmitted in accordance with the IEEE 802.11a/g standard (e.g., beacon frames). For example, the above-described assessment can be performed in response to a legacy short training field (L-STF) and a legacy signal field (L-SIG) of a packet preamble of a single stream packet. More specifically, the SNR is determined in response to the L-STF field, and the MCS is determined from the L-SIG field.

However, performing the above-described assessment for packets transmitted with multiple downlink data streams (hereinafter referred to as multi-stream packets) present a unique challenge. For a packet transmitted in accordance with the IEEE 802.11n standard, the above-described assessment is performed in response to a high throughput signal field HT-SIG 1&2 of the preamble (which provides the MCS and number of downlink data streams, Nss) and a high-throughput short training field HT-STF of the preamble (which is used to estimate SNR, in combination with the L-STF). Channel estimation typically begins in response to a high throughput long training field HT-LTF of the preamble, which is received immediately after the HT-STF field.

Similarly, for a packet transmitted in accordance with the IEEE 802.11ac standard, the above-described assessment is performed in response to a very high throughput signal field VHT-SIG A (which provides the MCS and number of downlink data streams, Nss) and a very high-throughput short training field VHT-STF (which is used to estimate SNR, in combination with the L-STF). Channel estimation typically begins in response to a very high throughput long training field VHT-LTF of the preamble, which is received immediately after the VHT-STF field.

The short amount of time that exists between receiving the HT-SIG 1&2 and HT-STF fields, and receiving the HT-LTF field of an 802.11n packet (and the short amount of time that exists between receiving the VHT-SIG A and VHT-STF fields, and receiving the VHT-LTF field of an 802.11ac packet) can result in problems with the channel estimation process, if the minimum required number of receive chains ($N_R$) is not determined by the time the channel estimation is to begin. The present invention provides various methods, described in more detail below, which enable the wireless device to identify and enable the minimum number of receive chains ($N_R$) in manners that do not adversely affect the channel estimation.

The present invention will now be described in more detail.

FIG. 1 is a block diagram of a wireless device 100 in accordance with one embodiment of the present invention. As described in more detail below, wireless device 100 can operate as a wireless station (STA) or a wireless access point (AP) in various embodiments of the present invention. Wireless device 100 includes multiple receive chains $101_1$-$101_N$, receive chain controller 102 and MIMO demodulator and decoder 110. Wireless device 100 includes other circuitry (e.g., transmit circuitry) well known to those of ordinary skill in the art that enable this device 100 to operate in accordance with the IEEE 802.11 standard. However, this other circuitry is not illustrated in FIG. 1 for reasons of clarity, as this other circuitry is not necessary to describe the present invention.

Receive chains $101_1$-$101_N$ are coupled to N corresponding antenna structures, as illustrated. The outputs of receive chains $101_1$-$101_N$ are provided to receiver chain controller 102. More specifically, the output signals provided by receive chains $101_1$-$101_N$ are provided to preamble processor 103 within receiver chain controller 102. As described in more detail below, preamble processor 103 extracts information from the preamble of each received packet, and uses this extracted information to access receiver sensitivity lookup table (LUT) 104. In response, receiver sensitivity LUT 104 provides a value $N_R$ that specifies a minimum number of receive chains required to be enabled to receive the current packet. Preamble processor 103 receives the $N_R$ value, and in response, controls receiver chains $101_1$-$101_N$, such that only the minimum number of receive chains specified by $N_R$ are enabled to receive the current packet. Preamble processor 103 further determines what combination of $N_R$ receiver chains is to be used. There are $^{Nmax}C_{NR}$ possible combinations of $N_R$ receiver chains (wherein Nmax=N in the described embodiments), and preamble processor 103 selects the combination in a manner that minimizes the decoding error probabilities. The specific selection technique is left to each particular implementation. However, one method could select the $N_R$ receiver chains such that the selected chains are the strongest chains, as determined by received signal strength indicator (RSSI) parameter or signal to noise ratio (SNR).

If the preamble processor 103 is required to disable one or more of the receive chains $101_1$-$101_N$ to reach the minimum number of receive chains $N_R$, preamble processor 103 may use selection diversity to determine which of the receive chains $101_1$-$101_N$ are enabled/disabled (wherein receive chains having the highest detected signal-to-noise ratio (SNR) are selected to remain enabled).

If the preamble processor 103 is required to disable one or more of the receive chains $101_1$-$101_N$ to reach the minimum number of receive chains $N_R$, preamble processor 103 may cause MIMO demodulation and decoder 110 to perform equalization using a reduced dimension Multi-Receive Chain (MRC) module 111 for the branches received with receive diversity. For the independent streams, a Maximum Likelihood MIMO (ML-MIMO) equalizer is directly used. That is, the preamble processor 103 reduces the processing dimensions of MRC module 111 to correspond with the number of enabled receive chains $101_1$-$101_N$.

The outputs of receive chains $101_1$-$101_N$ are also provided to MIMO demodulator and decoder 110. As described in more detail below, MIMO demodulator and decoder 110 performs channel estimation in response to the preamble of each received packet, wherein this channel estimation is based on the minimum number of enabled receiver chains $N_R$ determined by the receive chain controller 102 (as well as the number of spatial streams Nss used to transmit the received packet).

The operation of wireless device 100 will now be described in more detail. During a beacon receive mode (e.g., when wireless device 100 operates as a wireless station (STA) that wakes up to receive a DTIM from an associated wireless AP) and during an active receive mode (e.g., when wireless device 100 operates as either a station (STA) or a wireless AP that is enabled to receive data from an associated external wireless device), all N receive chains $101_1$-$101_N$ of wireless device 100 are initially enabled (activated) to receive one or more data streams transmitted from an external wireless device. While this configuration optimizes the receive sensitivity of the wireless station 100, this configuration typically consumes a significant amount of power. For example, the beacon receive mode in a 2.4 GHz or 5 GHz frequency band typically requires about 63-67% more power when using three receive chains (versus using a single receive chain). Similarly, the active receive mode in a 2.4 GHz or 5 GHz frequency band typically requires about 60-101% more power when using three receive chains (versus using a single receive chain). Significant power savings can therefore be realized if the number of active receive chains can be reduced.

The potential for reducing the number of active receive chains exists in the beacon receive mode. Beacons are always transmitted in a single stream (1SS) mode at a fixed MCS in both 2.4 and 5 GHz modes. As a result, when wireless station 100 is receiving a beacon signal, it is possible that the number of active receive chains can be reduced from the maximum number N down to a minimum value $N_R$ of 1.

The potential for reducing the number of active receive chains also exists in the active receive mode. For example, wireless APs typically include three or more radio frequency (RF) receive chains. Associated wireless stations include tablets, which typically include two RF transmit receive chains, and smart phones, which typically include one RF transmit chain. Thus, if wireless device 100 is a wireless AP receiving active frames from a tablet or a smart phone, it is possible that the number of active receive chains in the wireless AP can be reduced from the maximum number N down to a minimum value $N_R$ of 2 or 1 (depending on the number of RF transmit chains in the associated tablet or smart phone). This same opportunity also exists when the AP functionality is provided by a battery-powered device like a smart phone or a tablet when it operates in the Soft-AP mode or as a Peer-to-Peer Group Owner (P2P GO) device.

The potential for reducing the number of active receive chains also exists for wireless devices having more than one receive chain and operating as clients of soft AP. Some smart phones are capable of implementing a wireless hot-spot by operating as a soft AP having one RF transmit chain. Wireless device 100 may be a tablet (or other wireless device) having 2 or more receive chains, which is associated with a soft AP. In this case, it is possible that the number of active receive chains in the wireless device 100 can be reduced from the maximum number N down to a minimum value $N_R$ of 1. Although specific conditions have been described in which the number of active receive chains can be reduced have been described, it is understood that other conditions exist wherein the number of active receive chains may be reduced.

Wireless device 100 determines whether the number of active receive chains can be reduced as follows. Preamble processor 103 receives the preamble of each received packet from all of the receive chains $101_1$-$101_N$. Preamble processor 103 retrieves information from the received preamble that identifies the signal-to-noise ratio (SNR) of the received packet, the MCS used to process the received packet, and the number of spatial streams (Nss) used to transmit the received packet. The manner in which this information is identified is described in more detail below in connection with FIGS. 3 and 4.

Preamble processor 103 uses the SNR, MCS and Nss values identified from the preamble to access receiver sensitivity LUT 104. FIG. 2 is a block diagram of receiver sensitivity LUT 104 in accordance with one embodiment of the present invention. Receiver sensitivity LUT 104 specifies SNRs required to support selected numbers of receive chains with a 10 percent packet error rate (PER) for particular MCSs, particular channel bandwidths and particular numbers of active spatial streams Nss. For example, suppose the preamble processor 103 determines that the received packet implements modulation and coding scheme MCS=MCS0 and that the received packet is transmitted using 1 spatial stream (Nss=1). Further suppose that the received packet is received on a channel having a bandwidth of 20 MHz (as determined during the association process of the wireless device 100 with the device transmitting the received packet). In response, LUT 104 returns the SNR entries 201 to preamble processor 103, wherein these SNR entries indicate that the SNR of the received packet should be: at least −92 dB to allow wireless device 100 to receive the packet with a PER of 10% or less with only one receive chain enabled; at least −94 dB to allow wireless device 100 to receive the packet with a PER of 10% or less with only two receive chains enabled; and at least −96 db to allow wireless device 100 to receive the packet with a PER of 10% or less with three receive chains enabled. Preamble processor 103 uses the retrieved SNR entries 201, in combination with the detected SNR of the received packet, to determine the number of receive chains $101_1$-$101_N$ to remain active during the remaining processing of the received packet. In the present example, if the preamble processor 103 determines that the received packet exhibits an SNR of −92 dB, then the preamble processor 103 only leaves one of the receive chains $101_1$-$101_N$ enabled to receive the remainder of the packet.

In one embodiment, the preamble processor 103 initially determines the SNR of each of the signals provided by each of the receive chains $101_1$-$101_N$. In determining which of the receive chains should be enabled, and which should be disabled, the preamble processor 103 may select the receive chains that exhibited the highest SNR. In the present example, if the preamble processor 103 determines that the signal provided by the receive chain $101_1$ has the highest SNR, then preamble processor 103 controls a corresponding enable signal $EN_1$ to maintain the receive chain $101_1$ in the active state, and controls the remaining corresponding enable signals $EN_2$-$EN_N$ to disable the remaining receive chains for the duration of the received packet.

In another embodiment, if preamble processor 103 determines that more than one of the receive chains $101_1$-$101_N$ should remain enabled to receive the packet, then preamble processor 103 may select the receive chains having the least correlation, as determined by techniques known in the art. In yet another embodiment, preamble processor 103 determines that the particular receive chains to remain enabled are selected subject to the optimal performance of a MIMO equalizer circuit within MIMO demodulator and decoder 110, using any metric commonly known to those in the art.

In addition to disabling one or more of the receive chains $101_1$-$101_N$, preamble processor 103 also performs equalization by instructing MRC module 111 to use a reduced dimension corresponding to the number of receive chains that remain enabled (e.g., $N_R$).

Selecting the number of enabled receive chains on a per-packet basis in the manner described above advantageously allows the packet to be detected using the highest sensitivity of the wireless device 100 (e.g., with all receive chains $101_1$-$101_N$ initially enabled). The number of enabled receive chains may be reduced based on sampling the channel in the preamble of the received packet. By virtue of the 802.11 design, coherence time considerations and maximum length of the packet, a decision made during the preamble to reduce the number of enabled receive chains can be considered a valid decision for the entire duration of the packet. While the embodiments are described in the context of a single 802.11 family of packets, it is to be noted that the same considerations can be applied to a sequence of packets, exchanged in a burst, separated by short interframe space (SIFS) duration. This is also known in the prior art as "TROP Bursting". The duration of such Frame Exchange Sequences (FES) is guided by the value provided in the NAV field of the MAC header of the first packet. Applying the above embodiments, the decision to step down in receiver chains can be made from the prevailing conditions in the first packet and if the overall duration of the FES is within the bounds of the coherence time window, the decision can be reused as-is on the subsequent packets of the FES. Alternately, each packet of the FES can have this decision triggered anew. The choice is left to the particular implementation.

The manner in which the preamble processor 103 processes the packets provided by receive chains $101_1$-$101_N$ to determine the SNR, MCS, number of spatial streams Nss and minimum number of enabled receive chains $N_R$ will now be described in more detail.

Figure 3:
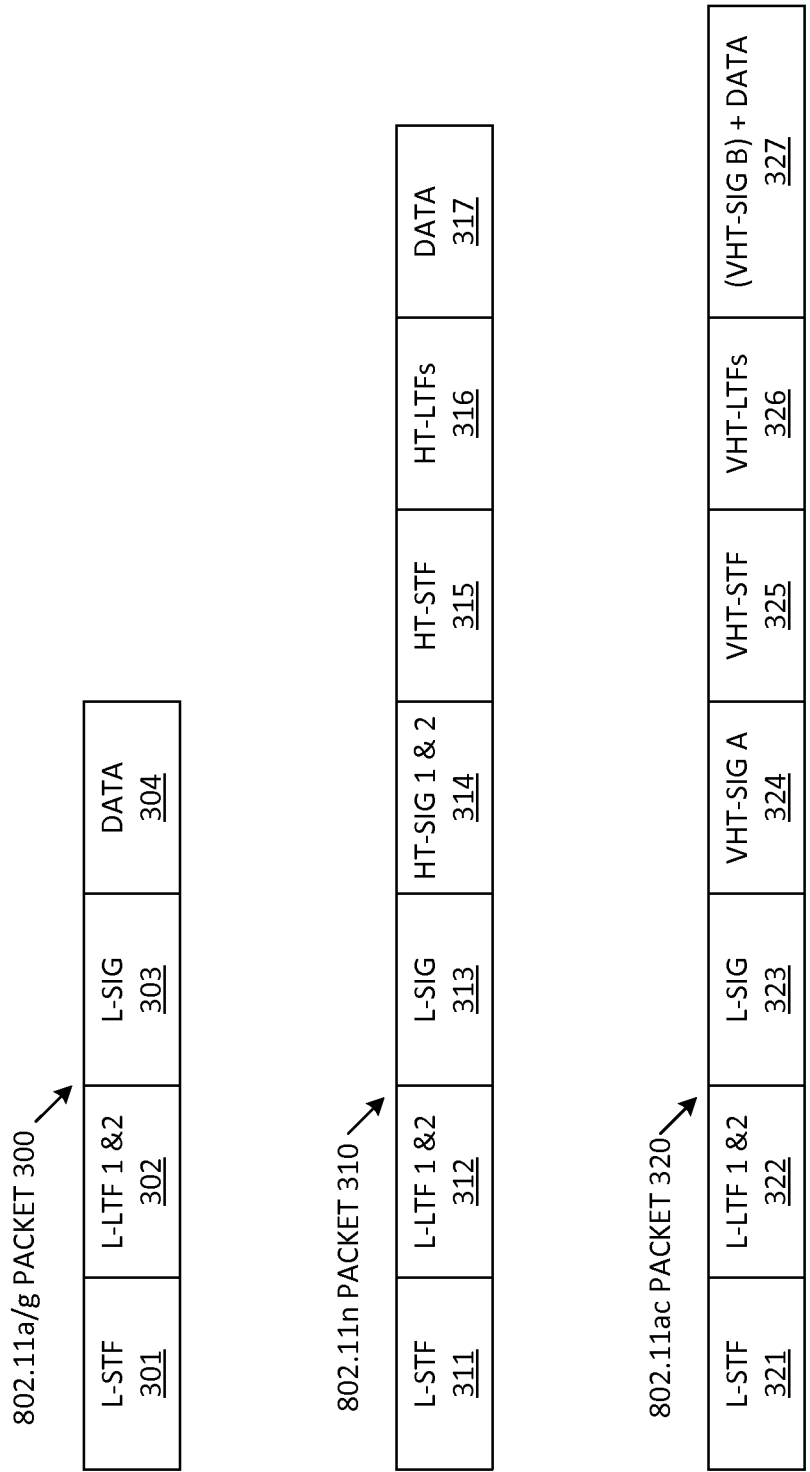
FIG. 3 is a block diagram illustrating the format of a legacy packet in accordance with the IEEE 802.11a/g standards, a high-throughput (HT) packet in accordance with the IEEE 802.11n standard, and a very high-throughput (VHT) packet in accordance with the IEEE 802.11ac standard, as used in accordance with one embodiment of the present invention.

FIG. 3 is a block diagram that illustrates the format of a legacy packet 300 in accordance with the IEEE 802.11a/g standards, a high-throughput (HT) packet 310 in accordance with the IEEE 802.11n standard, and a very high-throughput (VHT) packet 320 in accordance with the IEEE 802.11ac standard.

Legacy packet 300 includes legacy short training field (L-STF) 301, legacy long training field (L-LTF 1&2) 302 and legacy signal field (L-SIG) 303, which collectively form the preamble of packet 300. Packet 300 also includes a data field 304.

HT packet 310 includes L-STF field 311, L-LTF 1&2 field 312, L-SIG field 313, high-throughput signal field (HT-SIG 1&2) 314, high-throughput short training field (HT-STF) 315 and high-throughput long training fields (HT-LTFs) 316 which collectively form the preamble of packet 310. Packet 310 also includes a data field 317.

VHT packet 320 includes L-STF field 321, L-LTF 1&2 field 322, L-SIG field 323, very high-throughput signal field (VHT-SIG A) 324, very high-throughput short training field (VHT-STF) 325 and very high-throughput long training fields (VHT-LTFs) 326 which collectively form the preamble of packet 320. Packet 320 also includes a data field 327.

The high throughput signal field (HT-SIG 1&2) 314 and very high throughput signal field (VHT-SIG A) 324 may be generically referred to as (very) high-throughput signal fields (V)HT-SIG. Similarly, the high-throughput short training field HT-STF 315 and the very high-throughput short training field VHT-STF 325 may be generically referred to as (very) high-throughput short training fields (V)HT-STF. The high-throughput long training fields HT-LTFs 316 and the very high throughput long training fields VHT-LTFs 326 may be generically referred to as (very) high throughput long training fields (V)HT-LTFs.

Wireless device 100 is capable of receiving packets having any of the formats illustrated by FIG. 3 in accordance with one embodiment of the present invention.

Figure 4:
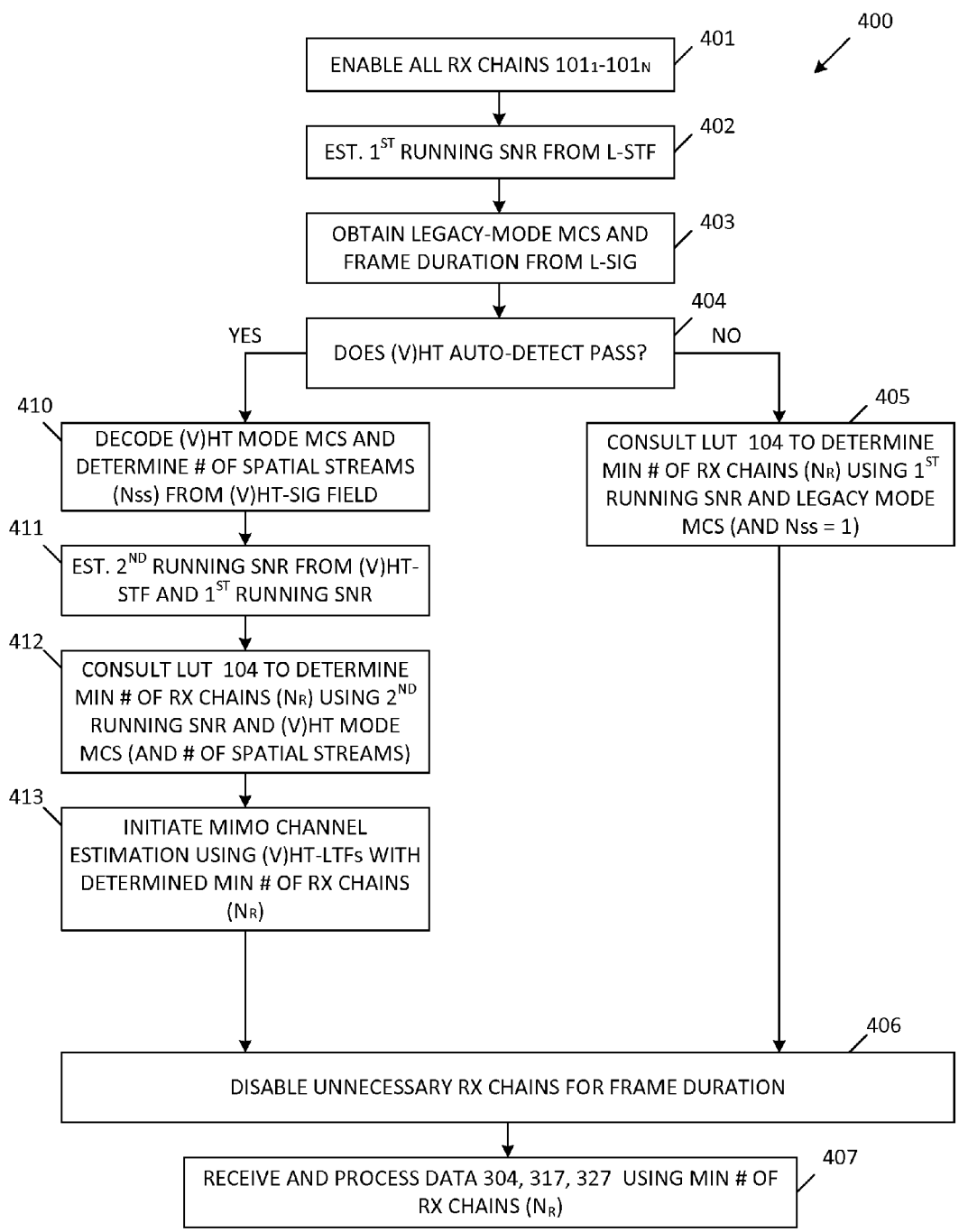
FIG. 4 is a flow diagram illustrating a method implemented by the wireless device of FIG. 1 to process the packets of FIG. 3 in accordance with one embodiment of the present invention.

FIG. 4 is a flow diagram 400 illustrating a method implemented by preamble processor 103 to process the packets 300, 310 and 320 of FIG. 3 in accordance with one embodiment of the present invention.

As illustrated by FIG. 4, all of the receive chains $101_1$-$101_N$ are initially enabled to receive the incoming packet (Step 401). Packet processor 103 estimates a first running SNR from the L-STF field (e.g., L-STF 301, 311 or 321) of the received packet (Step 402).

Packet processor 103 also obtains the legacy mode MCS and duration of the received packet from the L-SIG field (e.g., L-SIG 303, 313 or 324) of the received packet (Step 403).

Packet processor 103 then implements a (V)HT auto-detection process (Step 404), wherein the packet processor 103 determines whether the received packet includes a (V)HT-SIG field (e.g., HT-SIG 1&2 314 or VHT-SIG A 324), thereby determining whether the received packet is a legacy packet (e.g., packet 300) or a (V)HT packet (e.g., packet 310 or 320). If packet processor 103 determines that the (V)HT auto detection process does not pass (Step 404, No branch), thereby indicating that the received packet is a legacy packet 300 transmitted using a single spatial stream (Nss=1), then processing proceeds to Step 405.

In Step 405, packet processor 103 accesses receive sensitivity LUT 104 in the manner described above to determine the minimum number of receive chains ($N_R$) in response to the first running SNR determined in Step 402, the legacy mode MCS determined in Step 403, and the fact that the packet is transmitted using a single spatial stream (Nss=1).

Processing then proceeds to Step 406, wherein packet processor disables the unnecessary receive chains in the manner described above, for a time period defined by the frame duration determined in Step 403. MIMO demodulator and decoder 110 then receives (and processes) the data (e.g., data 304) of the received (legacy mode) packet using the determined minimum number of receive chains, $N_R$ (Step 407).

Returning to Step 404, if packet processor 103 determines that the (V)HT-auto detection process passes (Step 404, Yes branch), thereby indicating that the received packet is either an HT packet 310 or a VHT packet 320, then processing proceeds to Step 410.

In Step 410, packet processor 103 decodes the (V)HT-SIG field of the received packet to determine the (V)HT mode MCS used to transmit the received packet and the number of spatial streams used to transmit the received packet (Nss).

Packet processor 103 then estimates a second running SNR value in response to the (V)HT-STF field (e.g., HT-STF 315 or VHT-STF 325) of the received packet, building on the first running SNR value determined in Step 402 (Step 411).

Packet processor 103 then accesses receive sensitivity LUT 104 in the manner described above to determine the minimum required number of receive chains ($N_R$) in response to the second running SNR determined in Step 411, the (V)HT mode MCS determined in Step 410, and the number of spatial streams Nss determined in Step 410 (Step 412).

Packet processor 103 provides the determined minimum number of receive chains ($N_R$) to MIMO demodulator and decoder 110, which performs channel estimation in response to the received (V)HT-LTFs (e.g., HT-LTFs 316 or VHT-LTFs 326) using an H matrix having dimensions of Nss×$N_R$ (Step 413).

Processing then proceeds to Step 406, wherein any unnecessary receive chains are disabled, such that the determined minimum number of receive chains ($N_R$) are enabled for the frame duration. MIMO demodulator and decoder 110 receives and processes the data fields of the received packet (e.g., data 317 or data 318) using the determined minimum number of receive chains ($N_R$) and the channel estimation determined during Step 413 (Step 407).

Note that the channel estimation process is initiated from the symbols of the (V)HT-LTFs. It is therefore desirable to determine the minimum number of active receive chains ($N_R$) by the time the (V)HT-LTF symbols are received. However, the (V)HT-SIG fields (314 or 324) are typically not decoded until well into the reception of the (V)HT-LTF symbols (316 or 326). In the absence of a determination of the minimum number of active receive chains ($N_R$), the channel estimation would be initiated using the maximum number (N) of receive chains (i.e., a Nss×N dimension H matrix would be determined). However, it is not practically feasible, though mathematically possible, to change the channel estimation to a lower dimension (to reflect a reduced number of receive chains $N_R$) after the channel estimation is started (or completed) for the maximum number (N) of receive chains. The impracticality is caused by the choice of matrix processing used for the evaluating the channel estimation matrix. Those skilled in the art are aware of the various matrix processing possible. LDL and QRD matrix decomposition techniques are widely used, and in both cases it is practically infeasible to reduce the column dimension of the matrix on the fly. The present invention provides the following solutions to this potential problem.

In one embodiment, the preamble processor 103 is operated at a frequency high enough to ensure that the (V)HT-SIG field (314 or 324) is decoded, and the minimum number of active receive chains $N_R$ is determined, before the (V)HT-LTF symbols (316 or 326) arrive. In this case, the channel estimation is performed using the determined minimum number of active receive chains $N_R$ (i.e., a Nss×$N_R$ dimension H matrix is determined).

In another embodiment, the received (V)HT-LTF symbols are buffered by the preamble processor 103 (and the channel estimation is delayed) until the (V)HT-SIG field is decoded and the minimum number of active receive chains $N_R$ is determined. In this case, the channel estimation is performed using the determined minimum required number of active receive chains $N_R$ and buffered the (V)HT-LTF symbols (which are provided by the preamble processor 103 to MIMO demodulator and decoder 110).

In yet another embodiment, MIMO demodulator and decoder 110 performs multiple channel estimations, each assuming a different number of enabled receive chains, subject to pre-defined chain selection logic. The correct channel estimation is subsequently selected in view of the eventually determined minimum required number of active receive chains $N_R$.

In accordance with another embodiment of the present disclosure, channel reciprocity principles are applied, wherein the minimum required number of active receive chains $N_R$ is determined in the manner described above, and the result is used to select a corresponding number of active transmit chains $N_T$ (wherein $N_T=N_R$, and $N_T$ is greater than or equal to the number of spatial streams Nss of the transmit path) used to transmit signals back to the wireless device that originally transmitted the signal received by wireless device 100. By reducing the number of active transmit chains from N to $N_T$, transmit diversity is reduced, and power used to transmit various signals (e.g., acknowledge (ACK) messages or block acknowledge messages), is advantageously reduced. In other words, the receive diversity redundancy knowledge from the downlink path is used to trade off transmit diversity on the uplink path.

In accordance with another embodiment of present disclosure, receive chains that are not used (i.e., receive chains that are not included in the selected set of active receive chains $N_R$) are repurposed to receive other signals. For example, an unused receive chain can be used to perform scanning for other adjoining 802.11 channels as long as hardware changes necessary to enable a dual synthesizer operation are provided. Such technique would assist the STA WiFi device to scan for other Access Points in the vicinity without impairing its connectivity with the serving Access Point. Conversely, such technique can be used by an Access Point to perform spectral or radar scan while still servicing the associated clients on the other receive chain(s). In another example, an unused receive chain can be loaned to a Bluetooth receiver on the same device, thereby allowing this Bluetooth to receive achieve receive diversity. Note that WiFi and Bluetooth receive operations may proceed simultaneously in this example.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

We claim:

1. A method comprising:
   receiving a preamble of a packet transmitted over a wireless medium with a plurality of receive chains;
   determining a first signal-to-noise ratio (SNR) in response to a legacy short training field (L-STF) of the preamble;
   determining a second SNR in response to a (very) high-throughput short training field ((V)HT-STF) of the preamble and the first SNR; and
   determining a minimum number of the receive chains required to receive the packet with a predetermined packet error rate in response to the second SNR.

2. The method of claim 1, further comprising:
   decoding a (very) high-throughput signal field ((V)HT-SIG) of the preamble to identify a modulation and coding scheme (MCS) of the packet; and
   determining the minimum number of the receive chains in response to the MCS of the packet.

3. The method of claim 2, further comprising:
   decoding the (V)HT-SIG field of the preamble to determine that the packet is a beamformed packet having a plurality of spatial streams; and
   determining the minimum number of the receive chains in response to a number (Nss) of the plurality of spatial streams.

4. The method of claim 3, further comprising:
   receiving (very) high-throughput long training fields ((V)HT-LTFs) of the preamble after receiving the (V)HT-STF and the (V)HT-SIG field of the preamble;
   decoding the (V)HT-SIG field at a frequency high enough to ensure that the decoding of the (V)HT-SIG field is completed by the time the (V)HT-LTFs are received.

5. The method of claim 1, further comprising shutting off one or more of the plurality of receive chains, such that only the minimum number of the receive chains is enabled to receive a data field of the packet.

6. The method of claim 5, wherein the one or more of the plurality of receive chains is shut off on a packet-by-packet basis for each packet received over the wireless medium.

7. The method of claim 1, wherein the minimum number of the receive chains is determined by accessing a lookup table.

8. The method of claim 1, further comprising performing channel estimation in response to the minimum number of the receive chains.

9. The method of claim 8, further comprising determining the minimum number of the receive chains before receiving (very) high-throughput long training fields ((V)HT-LTFs)) of the preamble of the packet.

10. The method of claim 8, further comprising:
    buffering (very) high-throughput long training fields ((V)HT-LTFs)) of the preamble while the minimum number of the receive chains is determined; and
    performing channel estimation using the buffered (V)HT-LTFs after determining the minimum number of the receive chains.

11. The method of claim 8, further comprising:
    performing a plurality of channel estimations in parallel, wherein each of the channel estimations uses a different number of receive chains; and
    selecting one of the plurality of channel estimations in response to the determined minimum number of the receive chains.

12. The method of claim 1, further comprising selecting a number of active transmit chains to correspond with the determined minimum number of the receive chains.

13. The method of claim 1, further comprising:
using a first set of the plurality of receive chains to receive a data field of the packet, wherein the first set of the plurality of receive chains includes the determined minimum number of the receive chains; and
using a second set of one or more of the plurality of receive chains to receive a wireless signal other than the packet.

14. The method of claim 13, wherein the packet and the wireless signal other than the packet are each provided in accordance with the same wireless standard.

15. The method of claim 13, wherein the packet and the wireless signal other than the packet are provided in accordance with different wireless standards.

16. A method comprising:
receiving a preamble of a packet transmitted over a wireless medium with a plurality of receive chains;
determining a first signal-to-noise ratio (SNR) in response to a first field of the preamble of the packet;
decoding a second field of the preamble of the packet to identify a modulation and coding scheme (MCS) of the packet and determine that the packet is a beamformed packet having a number of spatial streams greater than one;
determining a second SNR in response to a third field of the preamble of the packet and the first SNR; and
determining a first number of the plurality of receive chains required to reliably receive the packet in response to the identified MCS, the second SNR and the number of spatial streams; and
shutting off one or more of the plurality of receive chains, such that only the first number of the plurality of receive chains is enabled to receive a data portion of the packet.

17. The method of claim 16, wherein the second field of the preamble is a (very) high-throughput signal field (V)HT-SIG.

18. The method of claim 16, wherein the third field of the preamble is a (very) high throughput short training field (V)HT-STF.

19. The method of claim 16, further comprising performing channel estimation in response to the determined first number of the receive chains.

20. The method of claim 16, further comprising determining the first number of the receive chains before receiving (very) high-throughput long training fields ((V)HT-LTFs) of the preamble of the packet.

21. The method of claim 16, further comprising:
buffering a fourth field of the preamble of the packet while determining the first number of the receive chains; and
performing channel estimation using the buffered fourth field of the preamble after determining the first number of the receive chains.

22. The method of claim 16, further comprising:
performing a plurality of channel estimations in parallel, wherein each of the channel estimations uses a different number of receive chains; and
selecting one of the plurality of channel estimations in response to the determined first number of the receive chains.

23. The method of claim 16, further comprising selecting a number of active transmit chains to correspond with the determined first number of the receive chains.

24. A wireless device comprising:
a plurality of receive chains to receive a preamble of a packet transmitted over a wireless medium;
a receive chain control, coupled to the plurality of receive chains, to:
determine a first signal-to-noise ratio (SNR) from a legacy short training field (L-STF) of the preamble;
determine a second SNR from a (very) high-throughput short training field ((V)HT-STF) of the preamble and the first SNR; and
determine a minimum number of the receive chains required to receive the packet with a predetermined packet error rate from the second SNR.

25. A wireless device comprising:
a plurality of receive chains to receive a preamble of a packet transmitted over a wireless medium;
a receive chain control, coupled to the plurality of receive chains, to:
determine a first signal-to-noise ratio (SNR) from a first field of the preamble of the packet;
decode a second field of the preamble of the packet to identify a modulation and coding scheme (MCS) of the packet, and determine that the packet is a beamformed packet having a number of spatial streams greater than one;
determine a second SNR from a third field of the preamble of the packet and the first SNR; and
determine a first number of the plurality of receive chains required to reliably receive the packet from the identified MCS, the second SNR and the number of spatial streams; and
shut off one or more of the plurality of receive chains, such that only the first number of the plurality of receive chains is enabled to receive a data portion of the packet.

* * * * *